United States Patent
Sueda et al.

(10) Patent No.: US 12,322,553 B2
(45) Date of Patent: Jun. 3, 2025

(54) DIELECTRIC COMPOSITION AND MULTILAYER CERAMIC ELECTRONIC COMPONENT

(71) Applicant: TDK CORPORATION, Tokyo (JP)

(72) Inventors: Yuichiro Sueda, Tokyo (JP); Kengo Aizawa, Tokyo (JP); Shota Kumagai, Tokyo (JP); Takeshi Shouji, Tokyo (JP); Satoshi Sugawara, Tokyo (JP); Masatoshi Tarutani, Tokyo (JP); Atsushi Yamada, Yurihonjo (JP); Manabu Kumagai, Yurihonjo (JP)

(73) Assignee: TDK CORPORATION, Tokyo (JP)

( * ) Notice: Subject to any disclaimer, the term of this patent is extended or adjusted under 35 U.S.C. 154(b) by 265 days.

(21) Appl. No.: 18/315,563

(22) Filed: May 11, 2023

(65) Prior Publication Data

US 2023/0386745 A1  Nov. 30, 2023

(30) Foreign Application Priority Data

May 30, 2022 (JP) .................................. 2022-087870

(51) Int. Cl.

| H01G 4/12 | (2006.01) |
| C04B 35/49 | (2006.01) |
| H01G 4/008 | (2006.01) |
| H01G 4/012 | (2006.01) |
| H01G 4/30 | (2006.01) |

(52) U.S. Cl.
CPC .......... *H01G 4/1227* (2013.01); *C04B 35/49* (2013.01); *H01G 4/008* (2013.01); *H01G 4/012* (2013.01); *H01G 4/30* (2013.01)

(58) Field of Classification Search
CPC ........ H01G 4/008; H01G 4/12; H01G 4/1227; H01G 4/30
See application file for complete search history.

(56) References Cited

U.S. PATENT DOCUMENTS

| 2009/0137381 A1 | 5/2009 | Takaishi et al. | |
| 2014/0055009 A1* | 2/2014 | Hatano | H10N 30/50 |
| | | | 310/366 |
| 2023/0090201 A1* | 3/2023 | Iguchi | C04B 35/49 |
| | | | 361/321.4 |
| 2023/0303451 A1* | 9/2023 | Iguchi | C04B 35/49 |

FOREIGN PATENT DOCUMENTS

JP  4678022 B2  4/2011

* cited by examiner

*Primary Examiner* — Nathan Milakovich
(74) *Attorney, Agent, or Firm* — Oliff PLC

(57) ABSTRACT

A dielectric composition, including: dielectric grains containing a main component represented by a composition formula $[(Ca_xSr_{(1-x)})O]_m[(Ti_yHf_zZr_{(1-y-z)})O_2]$ (m is more than 1.020); a grain boundary phase located between the dielectric grains; and segregation grains each containing at least Ca, Si, and O. A first segregation grain is defined as a segregation further containing Mn among the segregation grains each containing at least Ca, Si, and O, and a second segregation grain is defined as a segregation containing substantially no Mn among the segregation grains each containing at least Ca, Si, and O. N1/(N1+N2) is more than 0.23 and 1.00 or less, in which N1 is a number density of first segregation grains in a cross-section of the dielectric composition, and N2 is a number density of second segregation grains in the cross-section of the dielectric composition.

4 Claims, 5 Drawing Sheets

DIELECTRIC COMPOSITION AND MULTILAYER CERAMIC ELECTRONIC COMPONENT

TECHNICAL FIELD

The present disclosure relates to a dielectric composition and a multilayer ceramic electronic component containing the dielectric composition.

BACKGROUND

In an electronic circuit or a power supply circuit incorporated in an electronic device, a large number of electronic components such as a multilayer ceramic capacitor using dielectric characteristics exhibited by a dielectric are mounted. As a dielectric material used in such an electronic component, a $(Ca,Sr)(Zr,Ti,Hf)O_3$-based dielectric composition as shown in Patent Document 1 is known.

The dielectric composition disclosed in Patent Document 1 has a small change in capacitance depending on temperature and has COG characteristics defined by the Electronic Industries Alliance Standard (EIA standard). Therefore, the dielectric composition is suitably used in a multilayer ceramic electronic component for temperature compensation. However, it was found that pulse voltage withstand defects are likely to occur when thicknesses of dielectric layers are reduced, in the multilayer ceramic electronic component containing the above dielectric composition.

Patent Document 1: JP 4678022 B2

SUMMARY

The present disclosure is made in view of the above circumstances, and an object thereof is to provide a dielectric composition in which pulse voltage withstand defects are less likely to occur as compared with the related art, and a multilayer ceramic electronic component containing the dielectric composition.

In order to achieve the above object, a dielectric composition according to the present disclosure includes:
dielectric grains containing a main component represented by a composition formula $[(Ca_xSr_{(1-x)})O]_m[(Ti_yHf_zZr_{(1-y-z)})O_2]$;
a grain boundary phase located between the dielectric grains; and
segregation grains each containing at least Ca, Si, and O (oxygen), wherein
the composition formula satisfies $1.020 < m$,
a first segregation grain is defined as a segregation further containing Mn among the segregation grains each containing at least Ca, Si, and O,
a second segregation grain is defined as a segregation containing substantially no Mn among the segregation grains each containing at least Ca, Si, and O, and
$N1/(N1+N2)$ is more than 0.23 and 1.00 or less, in which N1 is a number density of first segregation grains in a cross-section of the dielectric composition, and N2 is a number density of second segregation grains in the cross-section of the dielectric composition.

As a result of intensive studies, the inventors of the present disclosure found that a defect rate regarding withstand pulse voltage can be reduced as compared with the related art when the dielectric composition has the above characteristics.

Preferably, the first segregation grain satisfies $0.38 < (M_{Mn}/M_{Si}) \leq 1.30$, in which $M_{Mn}$ (mol %) is a content rate of Mn in terms of MnO in the first segregation grain, and $M_{Si}$ (mol %) is a content rate of Si in terms of $SiO_2$ in the first segregation grain.

An average concentration of Mn in the grain boundary phase is preferably higher than an average concentration of Mn in the dielectric grains, and
at least one of the dielectric grains preferably has a concentration gradient in which a concentration of Mn decreases from a grain boundary toward a grain center, and preferably has substantially no Al concentration gradient.

The multilayer ceramic electronic component according to the present disclosure includes:
a ceramic layer containing the dielectric composition; and
an internal electrode layer in contact with the ceramic layer, wherein
$C_{IE}/C_D$ is less than 1.51, in which $C_D$ (mol %) is a content rate of Mn in the ceramic layer, and $C_{IE}$ (mol %) is a content rate of Mn in the internal electrode layer.

Since the multilayer ceramic electronic component has the above characteristics, the defect rate regarding withstand pulse voltage can be reduced as compared with the related art. The multilayer ceramic electronic component has COG characteristics and can be suitably used as an electronic component for temperature compensation.

DETAILED DESCRIPTION

Figure 1:
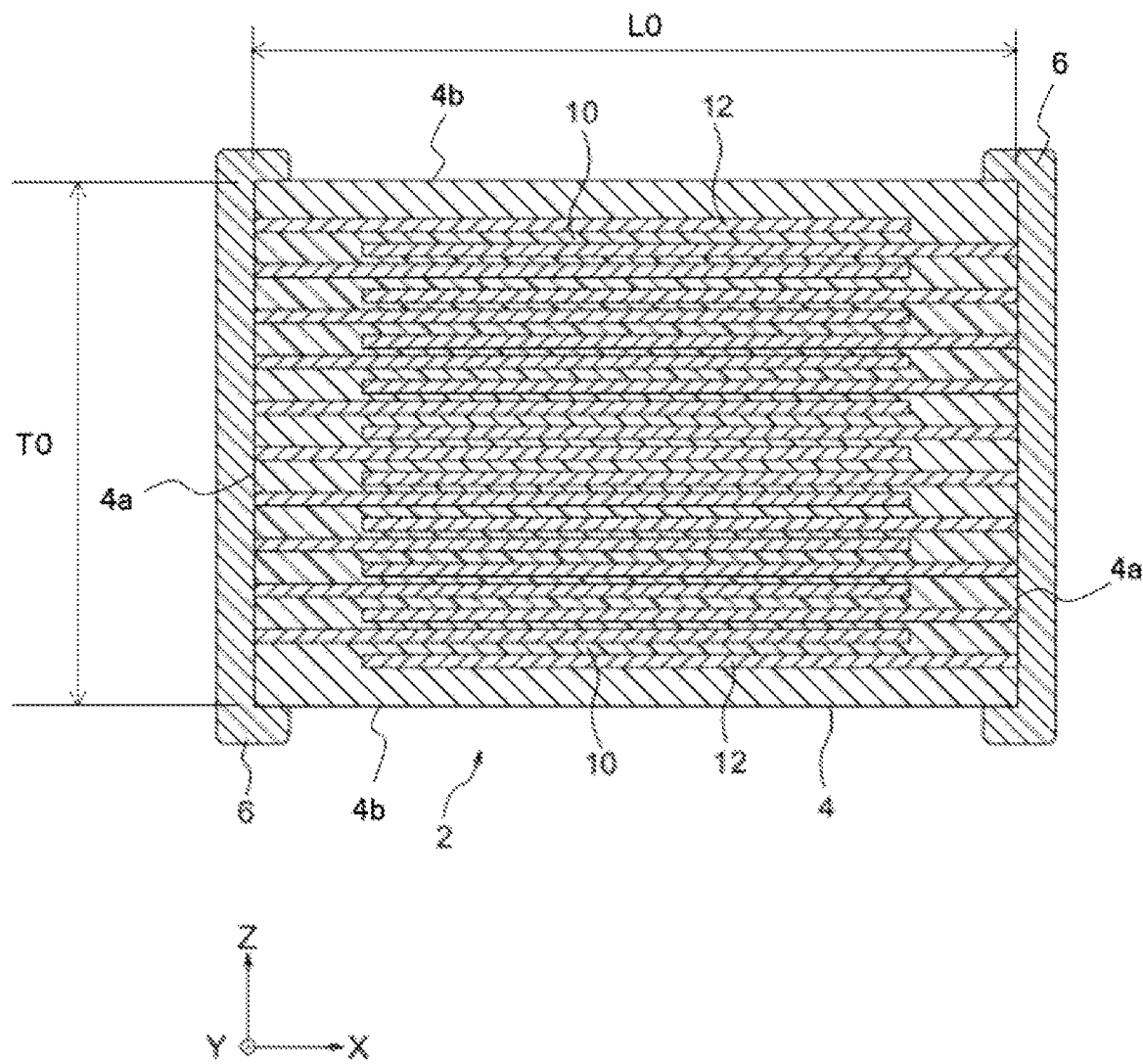
FIG. 1 is a schematic view showing a cross section of a multilayer ceramic capacitor according to an embodiment of the present disclosure.

Hereinafter, the present disclosure is described in detail based on an embodiment shown in the drawings.

In the present embodiment, a multilayer ceramic capacitor 2 shown in FIG. 1 is described as an example of an electronic component containing a dielectric composition according to the present disclosure. The multilayer ceramic capacitor 2 includes an element main body 4 and a pair of external electrodes 6 formed on an outer surface of the element main body 4.

A shape of the element main body 4 shown in FIG. 1 is generally a substantially rectangular parallelepiped shape, and has two end surfaces 4a facing each other in an X-axis direction, two side surfaces 4b facing each other in a Y-axis direction, and two side surfaces 4b facing each other in a Z-axis direction. However, the shape of the element main body 4 is not particularly limited, and may be an elliptical columnar shape, a columnar shape, or another prismatic shape. External dimensions of the element main body 4 are also not particularly limited. For example, a length L0 in the X-axis direction may be 0.4 mm to 5.7 mm, a width W0 in the Y-axis direction may be 0.2 mm to 5.0 mm, and a height T0 in the Z-axis direction may be 0.2 mm to 3.0 mm. In the present embodiment, the X axis, the Y axis, and the Z axis are perpendicular to one another.

The element main body 4 includes ceramic layers 10 and internal electrode layers 12 that are substantially parallel to a plane including the X axis and the Y axis, and the ceramic layers 10 and the internal electrode layers 12 are alternately stacked along the Z-axis direction inside the element main body 4. Here, "substantially parallel" means that most parts are parallel but may have some non-parallel parts, and the ceramic layers 10 and the internal electrode layers 12 may be slightly uneven or inclined.

Each of the ceramic layers 10 is formed of a dielectric composition to be described later. An average thickness (interlayer thickness) of the ceramic layers 10 per one layer is not particularly limited, and may be, for example, 100 μm or less, preferably less than 4 μm, and more preferably 2 μm or less. The number of the stacked ceramic layers 10 may be determined according to desired characteristics, and is not particularly limited. For example, the number of the stacked ceramic layers 10 is preferably 20 or more, and more preferably 50 or more.

On the other hand, each of the internal electrode layers 12 is stacked between the ceramic layers 10, and the number of the stacked internal electrode layers 12 is determined according to the number of the stacked ceramic layers 10. An average thickness of the internal electrode layers 12 per one layer is not particularly limited, and is preferably, for example, 3.0 μm or less. The average thickness of the ceramic layers 10 and the average thickness of the internal electrode layers 12 may be calculated by observing a cross section as shown in FIG. 1 using a metallurgical microscope and measuring the thickness of each of the layers (10 and 12) at least five positions.

The internal electrode layers 12 are stacked such that one end portions thereof are alternately exposed on the two end surfaces 4a of the element main body 4. The pair of external electrodes 6 are formed on the respective end surfaces 4a of the element main body 4 and are electrically connected to the exposed ends of the internal electrode layers 12 that are arranged alternately. By forming the internal electrode layers 12 and the external electrodes 6 in this manner, the external electrodes 6 and the internal electrode layers 12 constitute a capacitor circuit. That is, each of the ceramic layers 10 present in a capacitance region is sandwiched between the internal electrode layers 12 having different polarities, and a voltage can be applied to each of the ceramic layers 10.

Each of the internal electrode layers 12 is made of a conductive material, preferably contains Cu or Ni as a main component, and more preferably contains Ni as a main component. In a case where the main component of the internal electrode layers 12 is Ni, the conductive material of the internal electrode layers 12 is preferably pure Ni or a Ni-based alloy containing Ni in an amount of 85 wt % or more, and the Ni-based alloy may contain subcomponent elements such as Cu and Cr.

The internal electrode layers 12 may contain, as an inhibitor, particles of a perovskite compound having the similar composition as that of the main component of the ceramic layers 10 in addition to the above conductive material. Furthermore, the internal electrode layers 12 may contain a trace amount (for example, about 0.1 mass % or less) of a non-metal element such as S or P, and may contain voids. In a case where the internal electrode layers 12 contain an inhibitor, a void, or the like, disconnection portions where no electrode (conductive material) is present may be formed in the internal electrode layers 12.

The pair of external electrodes 6 may include a baked electrode layer, a resin electrode layer, a plated electrode layer, or the like, and may be implemented by a single electrode layer or may be implemented by stacking a plurality of electrode layers. For example, each of the external electrodes 6 may have a three-layer structure of a baked electrode layer containing Cu, a Ni plating layer, and an Sn plating layer (stacked in the described order). Since the Sn plating layer is located on the outermost surface of the external electrode 6 in a case where the external electrode 6 having the three-layer structure is formed, the solder wettability of the external electrode 6 is improved.

As shown in FIG. 1, each of the external electrodes 6 integrally includes an end surface portion formed at the end surface 4a of the element main body 4 and an extension portion formed at one end of the side surface 4b in the X-axis direction. That is, each of the pair of external electrodes 6 is formed to wrap around from the end surface 4a to a part of each side surfaces 4b of the element main body 4, and the external electrodes 6 are insulated so as not to be in contact with each other in the X-axis direction.

The extension portion of the external electrode 6 is not essential, and the external electrode 6 may include only the end surface portion. Alternatively, in a case where the multilayer ceramic capacitor 2 is surface-mounted on a substrate, at least the extension portion of the external electrode 6 may be formed on the side surface 4b facing a mounting surface of the substrate, and may not be formed on the side surface 4b opposite to the mounting surface.

Next, the dielectric composition of the ceramic layers 10 is described in detail.

The dielectric composition of the ceramic layer 10 contains a main component represented by a composition formula $[(Ca_xSr_{(1-x)})O]_m[(Ti_yHf_zZr_{(1-y-z)})O_2]$. The main component has a perovskite structure, in which Ca and Sr are elements comprising a site A of the perovskite structure ($ABO_3$), and Zr, Ti, and Hf are elements comprising a site B of the perovskite structure. The main component of the dielectric composition (that is, the main component of the ceramic layer 10) means a component occupying 80 mol % or more in the ceramic layer 10.

m, x, y, and z in the composition formula each represent an element ratio. Specifically, m represents a ratio of the site A to the site B, and in the present embodiment, m exceeds 1.020. When m is greater than 1.020, the pulse voltage withstand characteristics tend to be improved. In addition, m is preferably 1.024 or more and 1.040 or less, and more preferably 1.024 or more and 1.030 or less. When m is set in the above preferable range, the sinterability and the temperature characteristics of the dielectric composition are improved.

x in the composition formula represents the element ratio of Ca at the site A, and the main component preferably satisfies $0.5 \leq x \leq 1.0$, and more preferably satisfies $0.6 \leq x \leq 0.9$. y in the composition formula represents the element ratio of Ti at the site B, and z represents the element ratio of Hf at the site B. The main component of the dielectric composition preferably satisfies $0.01 \leq y \leq 0.10$, and more preferably satisfies $0.02 \leq y \leq 0.07$. The main component of the dielectric composition preferably satisfies $0.00 \leq z \leq 0.20$, and more preferably satisfies $0.00 \leq z \leq 0.10$.

The main component of the dielectric composition has the above composition, whereby good temperature characteristics can be obtained, and the COG characteristics can be satisfied. In addition, the sinterability of the dielectric composition can be improved, and the occurrence of cracks can be prevented.

The dielectric composition of the ceramic layer 10 contains Si, Al, and Mn as subcomponents. These subcomponents are all derived from compounds added as sintering aids in the manufacturing process, and are present in the state of an oxide or a composite oxide in the ceramic layer 10 after sintering. In the present embodiment, the content ratios of the subcomponents in the dielectric composition (that is, the ceramic layers 10 after sintering) are expressed in terms of oxide. Specifically, the content ratio of Si is expressed in terms of $SiO_2$, the content ratio of Al is expressed in terms of $Al_2O_3$, and the content ratio of Mn is expressed in terms of MnO.

When the total content ratio of Si, Al, and Mn in the dielectric composition is represented by $S_T$ in terms of oxide, the total content $S_T$ may be 1 part by weight to 5 parts by weight with respect to 100 parts by weight of the main component, and is preferably 1.00 part by weight or more and 1.53 parts by weight or less. By setting the total content ratio of the three kinds of subcomponents within the above range, it is possible to improve the sinterability while ensuring the dielectric characteristics.

The ratio of Si (that is, the ratio of $SiO_2$) in the total content ratio $S_T$ is denoted by $S_{Si}$, the ratio of Al (that is, the ratio of $Al_2O_3$) in the total content ratio $S_T$ is denoted by $S_{Al}$, and the ratio of Mn (that is, the ratio of MnO) in the total ratio content $S_T$ is denoted by $S_{Mn}$. $S_{Si}$ is preferably 35 parts by weight to 40 parts by weight with respect to 100 parts by weight of the total content ratio $S_T$, and more preferably 35 parts by weight or more and 38 parts by weight or less. $S_{Al}$ is preferably 2 parts by weight to 15 parts by weight with respect to 100 parts by weight of the total content ratio $S_T$, and more preferably 9 parts by weight or more and 12 parts by weight or less. $S_{Mn}$ may be 45 parts by weight to 63 parts by weight, is preferably 51.3 parts by weight or more and 63.0 parts by weight or less, and more preferably 51.3 parts by weight or more and 57.3 parts by weight or less.

The dielectric composition of the ceramic layer 10 may contain other subcomponents in addition to the subcomponents (Si, Al, and Mn) described above. Examples of other subcomponents include an Mg compound, a Cr compound, a Ni compound, a compound containing a rare earth element, a Li compound, a B compound, a V compound, and a Na compound, and the types, combinations, and content ratios of the other subcomponents are not particularly limited.

The composition of the ceramic layer 10 may be analyzed by inductively coupled plasma atomic emission spectrometry (ICP), laser ablation ICP mass spectrometry (LA-ICP-MS), fluorescent X-ray analysis (XRF), energy dispersive X-ray spectrometry (EDX), an electron beam microanalyzer (EPMA) including a wavelength dispersive X-ray spectrometer (WDS), or the like.

Figure 2:
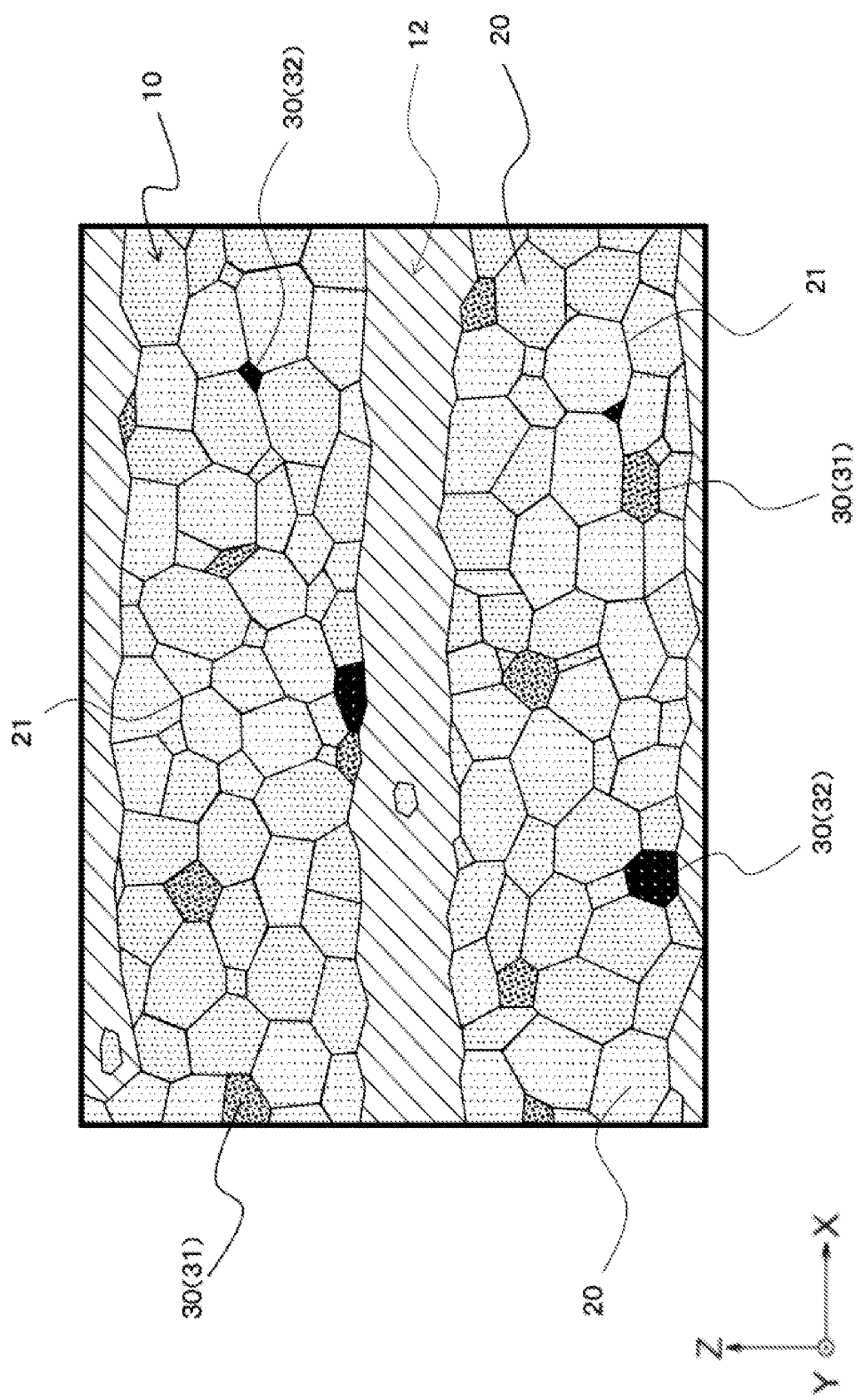
FIG. 2 is an enlarged cross-sectional view of ceramic layers 10 shown in FIG. 1.

The ceramic layers 10 containing the dielectric composition have an internal structure as shown in FIG. 2, and the ceramic layers 10 contains dielectric grains 20, segregation grains 30 having a predetermined feature, and grain boundary phases 21 located between the dielectric grains 20.

Each of the dielectric grains 20 is a main phase in the dielectric composition, and contains the main component of the ceramics layer 10 described above. In addition to the main component, the subcomponents may be solid dissolved in the dielectric grains 20. The dielectric grains 20 may have a core-shell structure by solid dissolving the other subcomponents such as the rare earth element. An average grain size of the dielectric grains 20 is not particularly limited, and may be, for example, 5 μm or less, and is preferably 0.10 μm to 2.00 μm.

The average grain size of the dielectric grains 20 can be measured by observing a cross section of the ceramic layers 10 as shown in FIG. 2 using a scanning transmission electron microscope (STEM), a scanning electron microscope (SEM), or the like, and analyzing the obtained cross-sectional photograph. For example, the average grain size of the dielectric grains 20 may be calculated by measuring circle equivalent diameters of at least five dielectric grains 20.

Each of the segregation grains 30 is a segregation phase (secondary phase) comprising of a composite oxide containing at least Ca, Si, and O (oxygen). The term "segregation phase" means a phase in which a specific element is present at a higher concentration than the dielectric grain 20 as the main phase. The Ca—Si—O-based segregation grains 30 can be classified into first segregation grains 31 containing Mn and second segregation grains 32 containing substantially no Mn. Here, "containing substantially no Mn" means that a content rate of Mn in the segregation grain 30 is less than 1.00 mol % in terms of MnO. A content rate of Mn in terms of MnO in each of the first segregation grains 31 is 1.00 mol % or more. An average content rate $M_{Mn}$ of Mn in terms of MnO in the first segregation grains is preferably 10 mol % or more, and more preferably 10 mol % or more and 66.7 mol % or less.

The first segregation grains 31 preferably contain (Ca, $Mn)_2SiO_4$. When an average content rate of Si in the first segregation grains 31 is denoted by $M_{Si}$ (mol %) in terms of $SiO_2$, an ratio of Mn to Si in the first segregation grains 31 ($M_{Mn}/M_{Si}$) is preferably more than 0.38 and 1.30 or less, and more preferably 0.40 or more and 1.0 or less. The first segregation grains 31 may contain Sr, Zr, Ti, Hf, Al, and the like in addition to the above elements (Ca, Si, Mn, O).

The second segregation grains 32 preferably contain $Ca_2SiO_4$, and the second segregation grains 32 may contain Sr, Zr, Ti, Hf, Al, and the like in addition to the above elements (Ca, Si, O).

In the present embodiment, a content ratio of the segregation grains 30 in the dielectric composition (that is, the ceramic layers 10) is represented by a number density (unit: $\mu m^{-2}$) of the segregation grains 30 in a cross-section of the dielectric composition, a number density of the first segregation grains 31 is denoted by N1, and a number density of the second segregation grains 32 is denoted by N2. A ratio (N1/(N1+N2)) of N1 to the sum of N1 and N2 is more than 0.23 and 1.00 or less. When the first segregation grains 32 containing Mn are present in the dielectric composition at the above ratio, the defect rate regarding withstand pulse voltage can be reduced as compared with the related art. N1/(N1+N2) is preferably 0.72 or more and less than 1.00, and more preferably 0.72 or more and 0.96 or less.

The content ratio of the segregation grains 30 (that is, a total content ratio (N1+N2) of the first segregation grains 31 and the second segregation grains 32) in the cross-section of the dielectric composition is preferably $0.05/\mu m^2$ or more and $0.50/\mu m^2$ or less, and more preferably $0.07/\mu m^2$ or more and $0.13/\mu m^2$ or less. The content ratio of the first segregation grains 31 (that is, Ni) in the cross-section of the dielectric composition is preferably $0.05/\mu m^2$ or more and $0.20/\mu m^2$ or less, and more preferably $0.05/\mu m^2$ or more and $0.12/\mu m^2$ or less.

The segregation grains 30 can be specified by mapping analysis using EDX or EPMA. For example, a cross section of the element main body 4 as shown in FIG. 2 is observed by SEM or STEM, and mapping analysis is performed on the observed cross section by EDX or EPMA during the observation. Then, a mapping image of each element in the dielectric composition is acquired by the mapping analysis. In the mapping image, it is possible to specify a region in which an content ratio of a predetermined element is high, that is, a region in which the predetermined element is segregated, based on shading of a color tone. Since the concentration of Ca and the concentration of Si in the segregation grains 30 are higher than those in the dielectric grains 20, regions in which Ca and Si are segregated in overlapping manner can be specified as the segregation grains 30 by overlaying the mapping image of Ca and the mapping image of Si.

When the segregation grains 30 are specified by mapping analysis, the first segregation grains 31 and the second segregation grains 32 can be classified. For example, regions in which Ca, Si, and Mn are segregated in overlapping manner are specified as the first segregation grains 31, and regions in which Ca and Si are segregated in overlapping manner and Mn is not segregated are specified as the second segregation grains 32, by overlaying mapping images of Ca, Si, and Mn. Alternatively, after regions in which Ca and Si are segregated in overlapping manner are specified as the segregation grains 30, point analysis may be performed on each of the segregation grains 30, the segregation grains 30 in which the content rate of Mn is 1.00 mol % or more may be specified as the first segregation grains 31, and the segregation grains 30 in which the content rate of Mn is less than 1.00 mol % may be specified as the second segregation grains 32.

The mapping analysis is preferably performed in a plurality of fields of view. In particular, when calculating N1/(N1+N2), it is preferable to measure N1 and N2 by performing mapping analysis on the cross section of at least 100 µm² in total to specify the first segregation grains 31 and the second segregation grains 32 contained in the analysis visual fields. The composition of the segregation grains 30 can be measured by performing point analysis by EDX or EPMA after specifying the segregation grains 30 by mapping analysis, and $M_{Mn}/M_{Si}$ is preferably calculated as an average value by performing point analysis on at least two first segregation grains 31.

Si, Al, and Mn, which are subcomponents of the dielectric composition, are not only contained in the secondary phase such as the segregation grains 30, but also are solid dissolved in the dielectric grains 20 which are the main phase and the grain boundary phases 21. These subcomponents may diffuse during firing and be contained not only in the ceramic layers 10 but also in the internal electrode layers 12. In the element main body 4 of the multilayer ceramic capacitor 2, in particular, Mn is preferably distributed so as to satisfy the following requirements.

A ratio ($C_{IE}/C_D$) of $C_{IE}$ to $C_D$ is less than 1.51, preferably 0.90 or less, and more preferably 0.80 or less, in which $C_D$ (mol %) is an average content rate of Mn in the ceramic layers 10, and $C_{IE}$ (mol %) is an average content rate of Mn in the internal electrode layers 12. Diffusion of Mn into the internal electrode layers 12 is suppressed to such an extent as to satisfy the above ratio ($C_{IE}/C_D$), whereby the defect rate regarding the withstand pulse voltage can be reduced. A lower limit of ($C_{IE}/C_D$) is not particularly limited, and for example, ($C_{IE}/C_D$) is preferably 0.40 or more.

The above $C_D$ and $C_{IE}$ can be calculated by quantitative analysis using EDX or EPMA. For example, in any cross section of the ceramic layers 10, at least 10 measurement points may be designated so as to avoid segregations, and $C_D$ may be calculated from an average value of analysis results at the measurement points. Similarly, in the cross section of the internal electrode layers 12, at least 10 measurement points may be designated so as to avoid segregations, and $C_{IE}$ may be calculated from an average value of analysis results at the measurement points.

In the ceramic layers 10, Mn is not only contained in the segregation grains 30 but also distributed in the dielectric grains 20 and the grain boundary phases 21. Other than the segregation grains 30 of the ceramic layers 10, Mn is preferably distributed in the grain boundary phases 21. In other words, an average concentration of Mn in the grain boundary phases 21 is preferably higher than an average concentration of Mn in the dielectric grains 20. Specifically, it is preferable to satisfy $MD_P < MD_B$, and it is more preferable to satisfy 0.3 wt $\% < (MD_B - MD_P)$, in which $MD_P$ is the average concentration of Mn in the dielectric grains 20, and $MD_B$ is the average concentration of Mn in the grain boundary phases 21. The $MD_P$ may be calculated by measuring concentration of Mn in the vicinity of a center of each dielectric grain 20, in the cross-section of the ceramic layers 10.

Figure 3A:
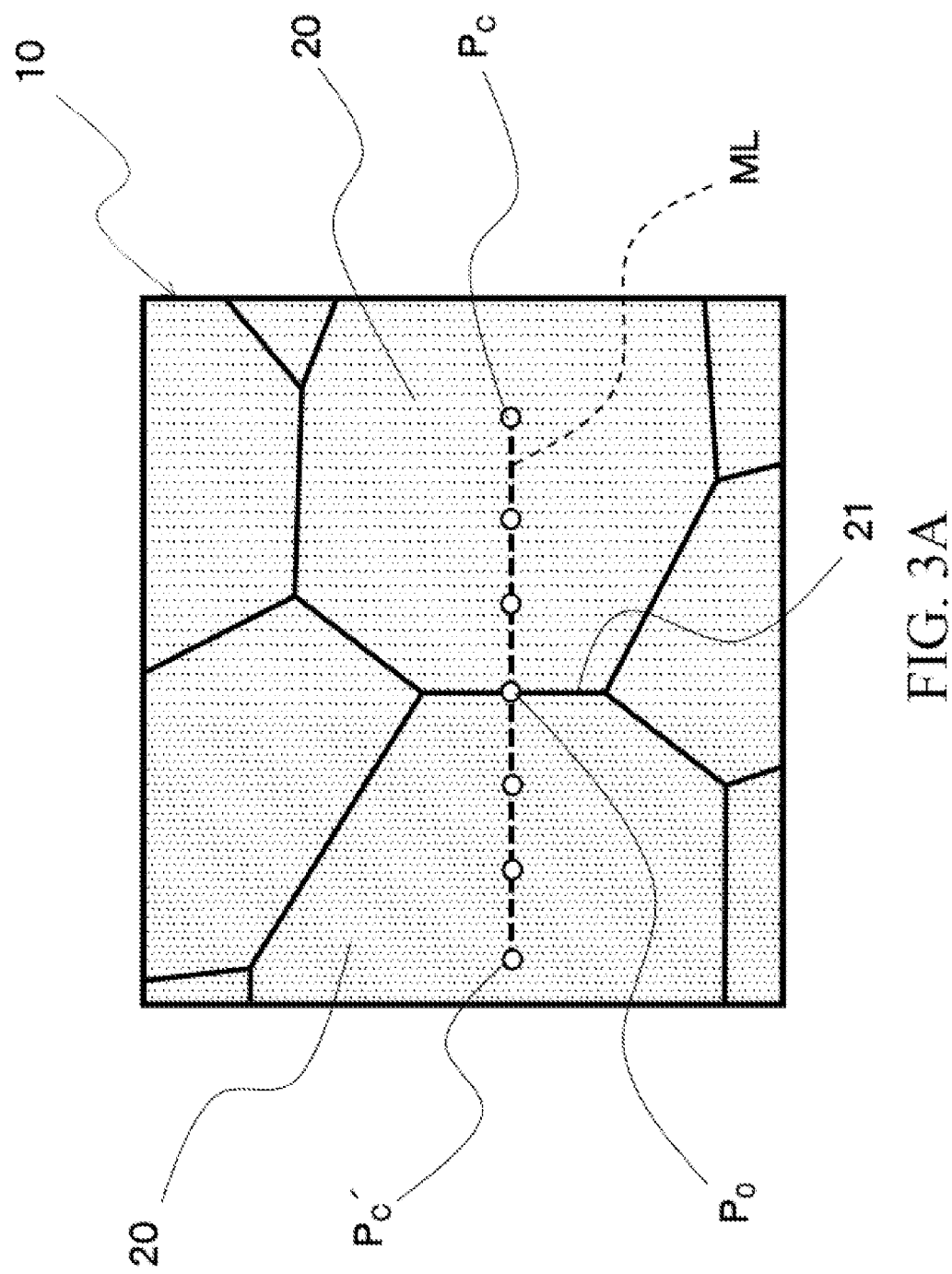
FIG. 3A is a conceptual diagram showing an example of line analysis performed on a cross section of a dielectric composition.

In the ceramic layers 10, at least one of the dielectric grains 20 preferably has a concentration gradient in which the concentration of Mn continuously decreases from a grain boundary side toward a center of the grain. Each of the dielectric grains 20 preferably has the concentration gradient of Mn, but dielectric grains 20 without the concentration gradient of Mn may be included in the ceramic layers 10 together with dielectric grains 20 having the concentration gradient of Mn. The concentration gradient of Mn can be analyzed by performing line analysis using EDX or EPMA when observing the cross section of the ceramic layer 10 using SEM or STEM. For example, as shown in FIG. 3A, a measurement line ML is drawn so as to connect centers of two dielectric grains 20 adjacent to each other via the grain boundary phase 21. Then, component analysis is performed at regular intervals along the measurement line ML. An interval between the measurement points at this time is preferably set to 0.05 µm to 0.2 µm. In the line analysis, a concentration change of each detection element on the measurement line ML can be analyzed. That is, it is possible to analyze how each constituent element of the dielectric composition is distributed from the grain boundary phase 21 toward the center of the dielectric grain 20.

Figure 3B:
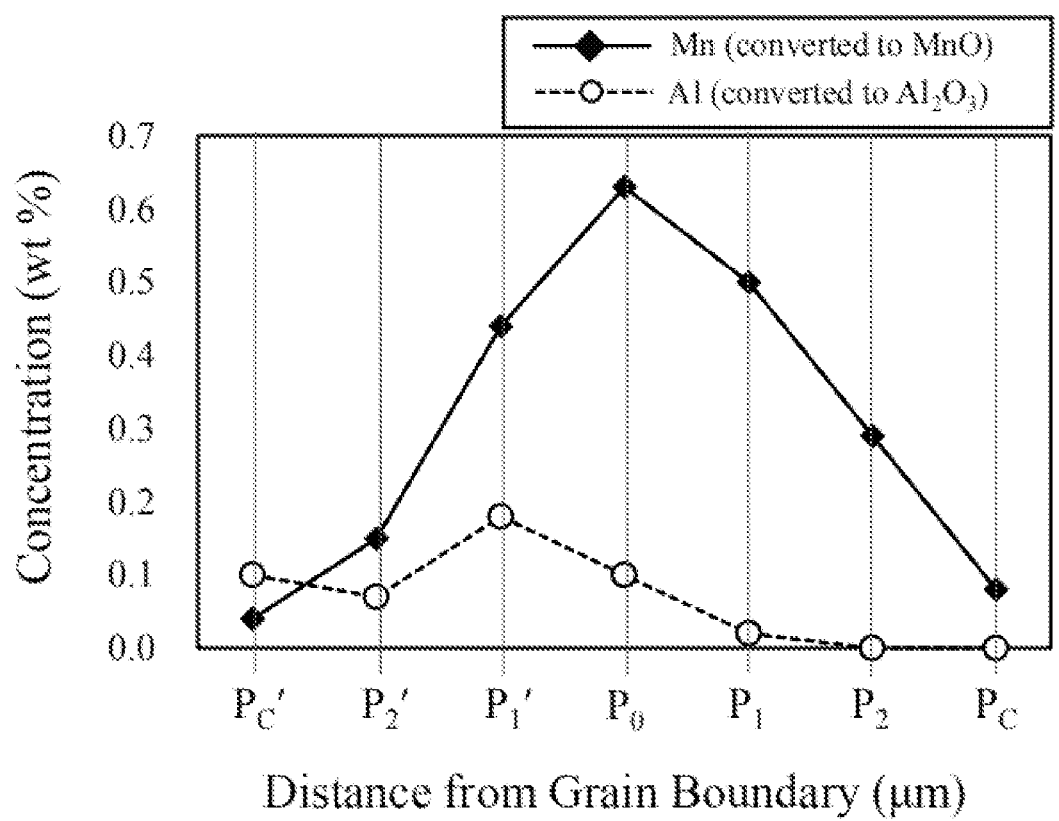
FIG. 3B is a graph showing an example of a line analysis result.

The graph shown in FIG. 3B is an example of the line analysis result. In FIG. 3B, a measurement point Po is the grain boundary phase 21, and measurement points PC and PC' are in the vicinity of the center of the dielectric grain 20. As shown in FIG. 3B, a local maximum of the Mn concentration exists in the grain boundary phase 21. The concentration of Mn gradually decreases from the grain boundary phase 21 toward the center of the dielectric grain 20.

Here, "the dielectric grain 20 has the concentration gradient of the predetermined element" means that the concentration of the predetermined element continuously increases or decreases at a gradient (absolute value of inclination) of 10.51 wt %/µm or more from the grain boundary toward the center of the grain in the line analysis as described above. Even if the concentration of the predetermined element is fluctuating in the grain, it is determined that "the concentration gradient is substantially not present" in a case where the concentration of the predetermined element does not continuously increase or decrease along the measurement line ML. In addition, even if the concentration of the predetermined element in the grain continuously increases or decreases, it is determined that "the concentration gradient is substantially not present" in a case where the gradient between the measurement points does not continuously become |0.5| wt %/µm or more. In other words, "the dielectric grain 20 does not substantially have the concentration gradient of the predetermined element" means a case where the concentration of the predetermined element does not continuously increase or decrease from the grain boundary toward the grain center, or a case where the concentration of the predetermined element continuously increases or decreases but the gradient is less than |0.5| wt % at least between some measurement points.

In the graph of the concentration of Mn shown in FIG. 3B, the concentration of Mn gradually decreases from the grain boundary phase 21 toward the center of the dielectric grain 20, and the absolute value of the gradient (inclination) between each measurement points is 0.5 wt % or more. Therefore, it is understood that both of the two dielectric grains 20 located on the measurement line have the concentration gradient of Mn. On the other hand, in the graph shown in FIG. 3B, the concentration of Al in the dielectric grain 20 slightly increases or decreases, but the gradient between the measurement points is not continuously |0.5| wt % or more. In this way, the dielectric grains 20 preferably have the concentration gradient of Mn, and preferably do not substantially have the concentration gradient of Al.

The concentration of Mn of the grain boundary phases 21 is higher than that of the dielectric grains 20, and the dielectric grains 20 have the concentration gradient of Mn, whereby the bonding strength between the adjacent dielectric grains 20 can be further improved. The concentration gradient of Mn as shown in FIG. 3B is more preferably observed in 70% or more of the dielectric grains 20 contained in the ceramic layers 10.

The grain boundary phases 21 include two-grain boundaries located between two dielectric grains 20 and multiple junctions located among three or more dielectric grains 20, and both the two-grain boundaries and the multiple junctions are composed of constituent elements of the main component and subcomponent elements. In addition to the above Ca—Si—O-based segregation grains 30, the ceramic layers 10 may contain other segregation phases, voids, or the like. Examples of the other segregation phases include a segregation phase containing Zr, a segregation phase containing Al, and a segregation phase containing other subcomponent elements such as Mg or a rare earth element.

Next, an example of a method for manufacturing the multilayer ceramic capacitor 2 shown in FIG. 1 is described.

First, the manufacturing process of the element main body 4 is described. In the manufacturing process of the element main body 4, a dielectric paste that becomes the ceramic layers 10 after firing and an internal electrode paste that becomes the internal electrode layers 12 after firing are prepared.

The dielectric paste is produced using a powder of a perovskite compound (hereinafter, referred to as a main component powder) which is the main component of the dielectric composition, and subcomponent powders which function as sintering aids. The main component powder can be produced by a solid phase method, a hydrothermal synthesis method, a sol-gel method, or the like. For example, in the solid phase method, raw materials such as a $CaCO_3$ powder, a $SrCO_3$ powder, a $ZrO_2$ powder, and a $TiO_2$ powder are uniformly mixed by wet mixing or the like, and then calcined to obtain the main component powder. At this time, the calcined main component powder may be appropriately subjected to a treatment such as pulverization and/or classification.

As the subcomponent powders to be added to the dielectric paste, it is possible to use a $SiO_2$ powder, an $Al_2O_3$ powder, and a Mn compound powder (preferably a $MnCO_3$ powder, a MnO powder, a $MnO_2$ powder, or a $Mn_3O_4$ powder, and more preferably a $MnCO_3$ powder), and the powders were weighed so that $S_T$, $S_{Si}$, $S_{Al}$, and $S_{Mn}$ become desired values. Alternatively, as the subcomponent powders, a composite oxide powder of Ca—Mn—Si—O and a composite oxide powder of Ca—Si—O may be used. These composite oxide powders can be produced by mixing the $SiO_2$ powder, the $Al_2O_3$ powder, and the Mn compound powder at a predetermined ratio, and calcining the mixture. In this case, the calcined composite oxide powder is preferably subjected to a treatment such as pulverization and/or classification. In a case where the composite oxide powders are used as the subcomponent powders, the content ratio (that is, N1 and N2) of each of the segregation grains (31 and 32) in the ceramic layers 10 can be controlled by the mixing ratio of the Ca—Mn—Si—O powder and the Ca—Si—O powder.

The dielectric paste can be obtained by adding the main component powder and the subcomponent powders to an organic vehicle and kneading the mixture. Here, the organic vehicle is obtained by dissolving a binder in an organic solvent. The binder to be used is not particularly limited, and may be appropriately selected from various binders such as polyvinyl butyral, acrylic, and ethyl cellulose. The organic solvent to be used is not particularly limited, and may be appropriately selected from various organic solvents such as methyl ethyl ketone, methanol, ethanol, acetone, toluene, terpineol, and butyl carbitol.

Although the above dielectric paste is an organic paint, the dielectric paste may be an aqueous paint using an aqueous vehicle. In this case, the aqueous vehicle is prepared by dissolving a water-soluble binder and dispersant in water. The water-soluble binder to be used is not particularly limited, and for example, polyvinyl alcohol, a water-soluble acrylic resin, or a water-soluble polyvinyl butyral resin can be used.

In a case where one or more subcomponents other than Si, Al, and Mn is added to the ceramic layers 10, one or more compound powders containing the other subcomponent may be added to the dielectric paste. Furthermore, the dielectric paste may contain additives selected from various dispersants, plasticizers, glass frit, and the like, as necessary.

The internal electrode paste may be produced by kneading a conductive powder together with an organic vehicle or an aqueous vehicle. For example, in a case where the main component of the internal electrode layer 12 is Ni, the internal electrode paste is obtained by kneading an organic vehicle with a conductive material such as a pure Ni powder or a Ni alloy powder. Alternatively, the internal electrode paste is obtained by kneading an organic vehicle with various oxides, organometallic compounds, resinates, or the like that become Ni or a Ni alloy after sintering. At this time, the main component powder of the dielectric paste may be added as an inhibitor to the internal electrode paste. The inhibitor exerts an effect of suppressing the sintering of the conductive powder in the firing process.

Next, the dielectric paste is formed into a sheet by a doctor blade method or the like to obtain a ceramic green sheet. Then, the internal electrode paste is applied onto the ceramic green sheet in a predetermined pattern by various printing methods such as screen printing or a transfer method. Further, a plurality of the green sheets on which the internal electrode pattern is formed are stacked and pressed in the stacking direction to obtain a mother laminated body. At this time, the ceramic green sheets and the internal electrode patterns are stacked so that the ceramic green sheets are located on the uppermost surface and the lowermost surface of the mother laminated body in the stacking direction.

The mother laminated body obtained by the above process is cut into a predetermined size by dicing or press-cutting to obtain green chips. If necessary, the green chips may be solidified and dried in order to remove a plasticizer or the like, and may be subjected to barrel polishing using a horizontal centrifugal barrel machine or the like after solidification and drying. In barrel polishing, the green chips are put into a barrel container together with mediums and a polishing liquid, and the barrel container is subjected to rotational movement, vibration, or the like. By the barrel polishing, unnecessary portions such as burrs generated at the time of cutting are polished to form rounded corners of the green chip. The green chips after barrel polishing are washed with a washing solution such as water and are dried. The barrel polishing may be performed after firing the green chips.

Next, the green chips obtained as described above are subjected to a binder removal treatment, a firing treatment, and an annealing treatment to obtain the element main body 4.

The conditions of the binder removal treatment may be appropriately determined depending on the type of the binder added to the dielectric paste and the internal electrode paste, and are not particularly limited. For example, the heating rate is preferably 5° C./hour to 300° C./hour (more preferably 10° C./hour to 100° C./hour), the treatment temperature is preferably 180° C. to 400° C. (more preferably 200° C. to 300° C.), and the holding time at the treatment temperature is preferably 0.5 hours to 24 hours (more preferably 5 hours to 20 hours). The atmosphere during the binder removal treatment can be an air atmosphere (that is, air) or a reducing atmosphere, and is preferably the air atmosphere.

Regarding the firing treatment, since it is considered that conditions such as the treatment temperature and the oxygen partial pressure affect the diffusion of Mn, it is preferable to set optimum conditions according to the main component of the internal electrode layers 12. For example, in a case where the main component of the internal electrode layers 12 is Ni, the treatment temperature during firing can be 1,100° C. to 1,350° C., and more preferably 1,200° C. to 1,300° C. The oxygen partial pressure during firing can be set to be $2.0 \times 10^{-13}$ atm or more and $1.0 \times 10^{-9}$ atm or less, and is preferably $1.0 \times 10^{-12}$ atm or more. In the related art, it has been considered to be desirable to reduce the oxygen partial pressure during firing as much as possible in order to prevent oxidation of Ni, but in the present embodiment, it is more preferable to perform firing in a weak reducing atmosphere having the higher oxygen partial pressure as compared with the related art.

Regarding firing conditions other than the above, the holding time at the treatment temperature is preferably 0.5 hours to 8 hours, and more preferably 1 hour to 3 hours. The heating rate and the cooling rate are preferably 50° C./hour to 500° C./hour, and more preferably 200° C./hour to 300° C./hour. As the atmospheric gas, a mixed gas of $N_2$ and $H_2$ is preferably humidified and used.

The annealing treatment is preferably performed after firing in order to reduce stress generated in the element main body 4. In the annealing treatment, for example, an attainment temperature is preferably 600° C. to 1,000° C., and the oxygen partial pressure is preferably $1.0 \times 10^{-10}$ atm to $1.0 \times 10^{-8}$ atm. The holding time at the attainment temperature is preferably 20 hours or shorter, and more preferably 2 hours to 10 hours. The heating rate and the cooling rate are preferably 50° C./hour to 500° C./hour, and more preferably 100° C./hour to 300° C./hour. As the atmospheric gas, it is preferable to use a dried $N_2$ gas, a humidified N2 gas, or the like.

In order to humidify the N2 gas, the mixed gas, or the like in the above binder removal treatment, firing treatment, and annealing treatment, for example, a wetting device or the like may be used, and in this case, the water temperature is preferably about 5° C. to 75° C. The binder removal treatment, the firing treatment, and the annealing treatment may be performed continuously or independently.

Next, the pair of external electrodes 6 are formed on the outer surface of the element main body 4 obtained as described above. A method for forming the external electrode 6 is not particularly limited. For example, in a case where a baked electrode is formed as the external electrode 6, a conductive paste containing a glass frit may be applied to the end surface of the element main body 4 by a dipping method, and then the element main body 4 may be heated at a predetermined temperature. In a case where a resin electrode is formed as the external electrode 6, a conductive paste containing a thermosetting resin may be applied to the end surface of the element main body 4, and then the element main body 4 may be heated at a temperature at which the thermosetting resin is cured. After the baked electrode and the resin electrode are formed by the above method, sputtering, vapor deposition, electrolytic plating, or electroless plating may be performed to form the external electrode 6 having a multilayer structure.

By the above steps, the multilayer ceramic capacitor 2 including the external electrodes 6 is obtained.

Summary of Embodiments

The dielectric composition according to the present embodiment includes the dielectric grains 20 containing a main component represented by a composition formula $[(Ca_xSr_{(1-x)})O]_m[(Ti_yHf_zZr_{(1-y-z)})O_2]$ (1.020<m), the grain boundary phase 21 located between the dielectric grains 20, and the segregation grains 30 each containing at least Ca, Si, and O (oxygen). The segregation grains 30 can be classified into the first segregation grains 31 containing Mn and the second segregation grains 32 containing substantially no Mn. The dielectric composition according to the present embodiment satisfies 0.23<(N1/(N1+N2))≤1.00, in which N1 is the number density of the first segregation grains 31 in the cross-section of the dielectric composition, and N2 is the number density of the second segregation grains 32 in the cross-section of the dielectric composition.

The multilayer ceramic capacitor 2 according to the present embodiment includes the element main body 4 in which the ceramic layers 10 and the internal electrode layers 12 are alternately stacked, and each of the ceramic layers 10 contains the dielectric composition described above. In the multilayer ceramic capacitor 2, the ratio ($C_{IE}/C_D$) of the content rate $C_{IE}$ (mol %) of Mn in the internal electrode layers 12 with respect to the content rate $C_D$ (mol %) of Mn in the ceramic layers 10 is less than 1.51.

As a result of intensive studies, the inventors of the present disclosure found that the distribution of Mn in the element main body 4 affects the pulse voltage withstand defects. Specifically, it is considered that in the multilayer ceramic capacitor in the related art, Mn added as sintering aids of the dielectric composition diffuses into the internal electrode layers at the time of firing, and bonding between the dielectric grains becomes insufficient, thereby causing the pulse voltage withstand defects. In particular, it is considered that in a case where the thickness of each ceramic layer is thinned to less than 4 µm, Mn is likely to diffuse into the internal electrode layers, and the pulse voltage withstand defects are likely to occur. It is considered that in the multilayer ceramic capacitor 2 according to the present embodiment, by dispersing the first segregation grains 31 in which Mn is solid dissolved and the second segregation grains 32 containing no Mn at a predetermined ratio, the ratio of Mn remaining in the ceramic layers 10 increases, and the bonding between the dielectric grains 20 becomes strong. As a result, the defect rate regarding the withstand pulse voltage can be reduced as compared with the related art.

In particular, the ratio ($M_{Mn}/M_{Si}$) of Mn to Si in the first segregation grains 31 is more than 0.38 and 1.30 or less, the defect rate regarding the withstand pulse voltage can be further reduced.

In the ceramic layers 10 of the multilayer ceramic capacitor 2, the average concentration of Mn in the grain boundary phase 21 is higher than the average concentration of Mn in the dielectric grains 20, and the dielectric grains 20 preferably have the concentration gradient of Mn. Although Si and Al are both subcomponents contributing to the sinterability, it is considered that by dispersing Mn as described above instead of Si and Al, the bonding between the dielectric grains 20 becomes stronger, and the defect rate regarding the pulse voltage can be further reduced.

In the multilayer ceramic capacitor 2 according to the present embodiment, it is possible to reduce the pulse voltage withstand defects while maintaining the characteristics such as the relative permittivity, the dielectric loss tangent, and the temperature characteristics by dispersing the first segregation grains 31 and the second segregation grains 32 at a predetermined ratio. In the multilayer ceramic capacitor 2, not only the pulse voltage withstand characteristic but also the insulation resistance (IR) and the breakdown dielectric voltage (BDV) can be improved as compared with the related art.

Hereinbefore, an embodiment of the present disclosure is described, but the present disclosure is not limited to the above embodiment, and various modifications can be made without departing from the gist of the present disclosure.

For example, although the multilayer ceramic capacitor 2 is exemplified as a multilayer ceramic electronic component in the present embodiment, the dielectric composition according to the present disclosure may be applied to other electronic components on which dielectric layers are formed. Examples of the other electronic components include a band-pass filter, a multilayer three-terminal filter, a thermistor, and a varistor.

Although the ceramic layers 10 and the internal electrode layers 12 are stacked in the Z-axis direction in the present embodiment, the stacking direction may be the X-axis direction or the Y-axis direction. In this case, the external electrodes 6 may be formed in accordance with the surfaces where the internal electrode layers 12 are exposed. The internal electrode layers 12 may be drawn out to the outer surface of the element main body 4 via a through-hole electrode, and in this case, the through-hole electrode and each external electrode 6 are electrically connected to each other.

Examples

Hereinafter, the present disclosure is described based on more detailed examples, but the present disclosure is not limited thereto.

In this experiment, multilayer ceramic capacitors according to Samples 1 to 6 were produced by the following procedures.

First, a main component powder for a dielectric paste was produced by a solid phase method. Specifically, a $CaCO_3$ powder, a $SrCO_3$ powder, a $TiO_2$ powder, a $ZrO_2$ powder, and a $HfO_2$ powder were prepared as raw materials, and the raw materials were weighed so that a fired main component had a desired composition. Then, the weighed raw materials were mixed and calcined, and then obtained calcined powder was pulverized by a ball mill to obtain the main component powder having an average particle size of 0.29 µm. The main component powder was common for the Samples 1 to 6.

Next, the main component powder, subcomponent powders, and an organic vehicle were kneaded to obtain a dielectric paste. In the Sample 1, a $SiO_2$ powder, an $Al_2O_3$ powder, and a MnO powder were added to the dielectric paste as the subcomponent powders, and in the Samples 2 to 6, a Ca—Si—O powder and a Ca—Mn—Si—O powder were added to the dielectric paste as subcomponent powders. The mixing ratio of the subcomponent powders with respect to the main component powder was common for the Samples 1 to 6, and the mixing ratio of the subcomponent powders was controlled so that $S_T$, $S_{Si}$, $S_{Mn}$, and $S_{Al}$ in the fired ceramic layers had desired values.

Next, green sheets were produced using the dielectric paste, and an internal electrode paste was applied onto each green sheet in a predetermined pattern. The internal electrode paste was produced by kneading a Ni powder and the organic vehicle. The green sheets on which the internal electrode pattern was formed were stacked and were pressed in the stacking direction to obtain a mother laminated body. At this time, protective green sheets on which no internal electrode pattern was formed were stacked on an upper surface and a lower surface of the mother laminated body. The mother laminated body was cut into a predetermined size by dicing to obtain green chips.

Next, the green chips were subjected to a binder removal treatment, a firing treatment, and an annealing treatment to obtain element main bodies (sintered bodies). The binder removal treatment and the annealing treatment were carried out under the same conditions for the Samples 1 to 6, and the conditions such as the treatment temperature were set within the range described in the embodiment. Regarding the firing treatment, the conditions other than the oxygen partial pressure were common in the Samples 1 to 6, the treatment temperature was 1,240° C., the holding time at the treatment temperature was 2 hours, and the atmosphere during firing was a humidified $N_2+H_2$ atmosphere. The oxygen partial pressure during firing was set to different values for the Samples 1 to 6. Specifically, the oxygen partial pressure for the Sample 1 was $1.0\times10^{-12}$ atm or less, the oxygen partial pressure for the Sample 2 was 16.2 times that for the Sample 1, the oxygen partial pressure for the Sample 3 was 23.7 times that for the Sample 1, the oxygen partial pressure for the Sample 4 was 8.9 times that for the Sample 1, the oxygen partial pressure for the Sample 5 was 2.6 times that for the Sample 1, and the oxygen partial pressure for the sample 6 was 2.0 times that for the Sample 1.

Next, an external electrode paste was applied to each end surface of the element main body and baked to form a pair of external electrodes, thereby obtaining a sample of a multilayer ceramic capacitor. In each of the Samples 1 to 6, 20,000 or more multilayer ceramic capacitors were produced. The size of each capacitor produced in the Samples 1 to 6 was L0×W0×T0=3.2 mm×1.6 mm×1.6 mm. In each capacitor, the number of ceramic layers (the number of stacked layers) sandwiched between the internal electrode layers was 255, the average thickness of the ceramic layers was 2.9 μm and the average thickness of the internal electrode layers was 1.0 μm.

The multilayer ceramic capacitors of each Samples produced in this experiment were evaluated as follows.

Component Analysis of Dielectric Composition

A composition of the main component and content ratios of subcomponents of the ceramic layers (dielectric composition) were analyzed by a fluorescent X-ray analyzer. As a result, it was confirmed that the compositions of the main component were the same in the Samples 1 to 6, and analysis values after firing and the compositions of the main component powder produced by the solid phase method were substantially the same. Specifically, each of the main component in the Samples 1 to 6 was represented by a composition formula $[(Ca_xSr_{(1-x)})O]_m[(Ti_yHf_zZr_{(1-y-z)})O_2]$, in which m was 1.02 to 1.04, x was 0.5 to 1.0, y was 0.01 to 0.10, and z was 0 to 0.20.

The content ratios of the subcomponents were substantially the same in the Samples 1 to 6. Specifically, the total content ratio $S_T$ of Si, Al, and Mn in the ceramic layers of each sample was 1 part by weight to 5 parts by weight with respect to 100 parts by weight of the main component. In each Sample, $S_{Si}$ is 35 parts by weight to 40 parts by weight, and $S_{Mn}$ is 45 parts by weight to 63 parts by weight, as $S_{Si}+S_{Al}+S_{Mn}=100$ parts by weight.

Cross-Section Analysis on Capacitor Sample

Mapping analysis by EPMA was performed on a cross section of the ceramic layers (dielectric composition) to specify segregation grains contained in the ceramic layers. In the mapping analysis, a total area of measurement field of views was set to 382 μm², the number density Ni of the first segregation grains (Ca—Mn—Si—O segregation) and the number density N2 of the second segregation grains (Ca—Si—O segregation) in the field of views were measured, and N1/(N1+N2) of each Sample was calculated.

The content rate $C_D$ (mol %) of Mn in the ceramic layers and the content rate $C_{IE}$ (mol %) of Mn in the Ni internal electrode layers were measured by quantitative analysis using EPMA, and $C_{IE}/C_D$ of each Sample was calculated from the measurement result.

Pulse Voltage Withstand Characteristics

In the pulse voltage withstand test, a DC voltage (test voltage) having a pulse waveform was applied to the produced capacitor sample, and a leakage current at that time was measured. The number of test samples in each of the Samples 1 to 6 was 20,000, the test voltage was set to a rated voltage or more, and the test voltage was applied to each test sample in both a positive direction and a negative direction. In this pulse voltage withstand test, the success or fail of the withstand voltage of each test sample was determined based on the leakage current. The number of NG (the number of test samples in which the withstand voltage was failed) when the test voltage in the positive direction was applied and the number of NG when the test voltage in the negative direction was applied were added to calculate the defect rate of each of the Samples 1 to 6. Then, the pulse voltage withstand index (P-TV index) of each of the Samples 1 to 6 was calculated based on the defect rate of 5,000 ppm. For example, in a case where the defect rate in the pulse voltage withstand test is 10,000 ppm, the P-TV index is 200 (no unit), and in a case where the defect rate in the pulse voltage withstand test is 2,500 ppm, the P-TV index is 50 (no unit). It is possible to determine that the lower the P-TV index, the better the pulse voltage withstand characteristics.

Measurement on Relative Permittivity ε and Dielectric Loss Tangent tan δ

The capacitance and the dielectric loss tangent (tan δ (%)) at room temperature (measurement temperature of 20° C.) were measured using an LCR meter. Then, the relative permittivity ε (no unit) of the capacitor sample was calculated based on an average thickness of the ceramic layers, an effective electrode area, and the measured capacitance. The above measurement was performed on 10 capacitor samples for each of the Samples 1 to 6, and average values thereof were calculated as ε and tan δ for each of the Samples 1 to 6.

Measurement on Dielectric Breakdown Voltage (BDV)

The dielectric breakdown voltage BDV of the capacitor sample was measured by the following method. Specifically, the capacitor sample was placed in an insulating oil at room temperature, a DC current was applied to the capacitor sample at a predetermined step-up voltage rate. Then, a voltage value (unit: V) was measured when the leakage current exceeded a predetermined reference value. The above measurement was performed on 50 capacitor samples for each of the Samples 1 to 6, and an average value of the measurement results was calculated as the dielectric breakdown voltage BDV (unit: V) for each of the Samples 1 to 6.

Measurement on Insulation Resistance IR

The insulation resistance IR of the capacitor sample was measured by the following method. Specifically, a DC voltage of 50 V was applied to the capacitor sample for 30 seconds at room temperature (20° C.), and then a resistance value (Ω) of the capacitor sample was measured using an insulation resistance meter. The above measurement was performed on 10 capacitor samples for each of the Samples 1 to 6, and an average value of the measurement results (average value of resistance values) was calculated as the insulation resistance IR (Ω) for each of the Samples 1 to 6.

The evaluation results for the Samples 1 to 6 are shown in Table 1.

TABLE 1

| Sample No. | | N1/(N1 + N2) (—) | $C_{LE}/C_D$ (—) | P-TV index (—) | ε (—) | tan δ (%) | BDV (V) | IR (Ω) |
|---|---|---|---|---|---|---|---|---|
| Sample 1 | Comp. Ex. | 0.23 | 1.511 | 4502 | 33.69 | 0.001 | 606 | $1.32 \times 10^{12}$ |
| Sample 2 | Ex. | 0.72 | 0.482 | 288 | 33.80 | 0.001 | 610 | $1.94 \times 10^{12}$ |
| Sample 3 | Ex. | 0.91 | 0.400 | 165 | 33.65 | 0.001 | 637 | $2.33 \times 10^{12}$ |
| Sample 4 | Ex. | 0.96 | 0.467 | 96 | 33.89 | 0.001 | 618 | $1.91 \times 10^{12}$ |
| Sample 5 | Ex. | 0.97 | 0.893 | 811 | 33.71 | 0.001 | 607 | $1.65 \times 10^{12}$ |
| Sample 6 | Ex. | 1.00 | 0.828 | 653 | 33.90 | 0.001 | 603 | $1.71 \times 10^{12}$ |

In this experiment, the Sample 1 corresponded to Comparative Example, and in the Sample 1, N1/(N1+N2) indicating an content ratio of the first segregation grains (Ca—Mn—Si—O segregation) was 0.23. On the other hand, in the Samples 2 to 6, the content ratio of the first segregation grains was higher than that of the Sample 1, and the P-TV index could be reduced than that of the Sample 1. From this result, it was found that when the dielectric composition comprising the ceramic layers satisfies $0.23<(N1/(N1+N2)) \leq 1.00$, the defect rate regarding the pulse voltage withstand can be reduced as compared with Comparative Example (Sample 1) in the related art.

Figure 4:
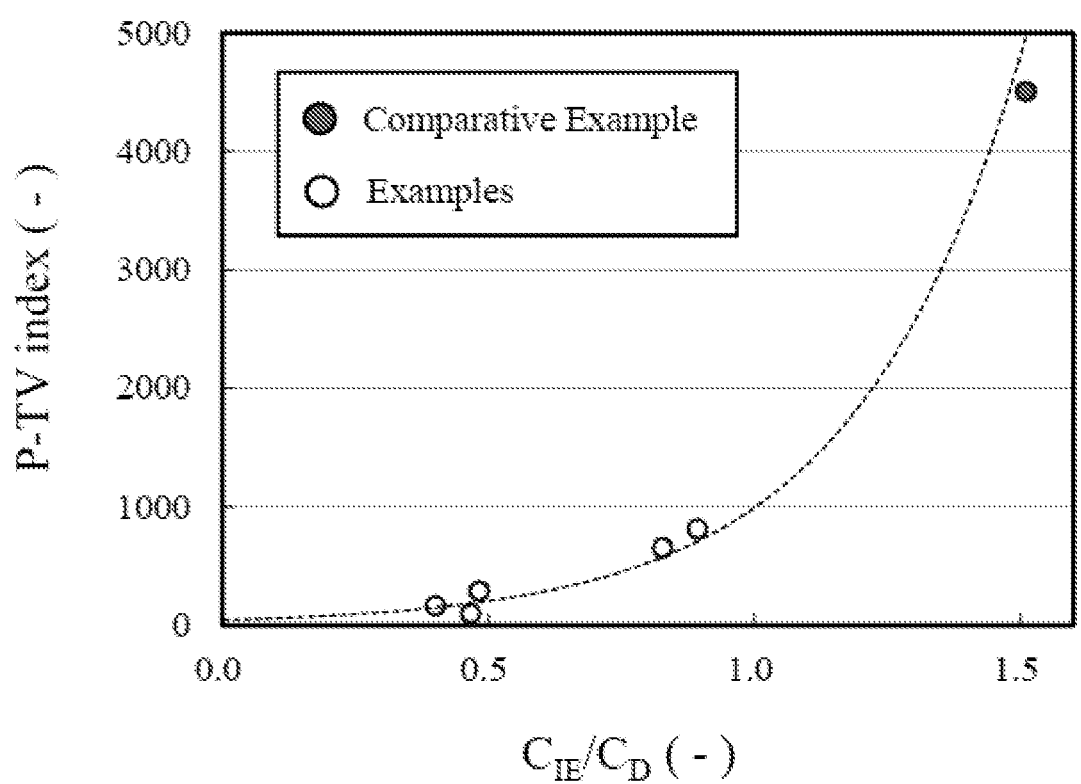
FIG. 4 is a graph showing a relationship between $C_{IE}/C_D$ and a pulse voltage withstand index (P-TV index).

In the Sample 1, which is Comparative Example, the $C_{IE}/C_D$ relating to the Mn distribution in the element main body was 1.51 or more. On the other hand, in the Samples 2 to 6, which are Examples, the $C_{IE}/C_D$ was lower than that of the Sample 1. FIG. 4 is a graph plotting a relationship between the $C_{IE}/C_D$ and the P-TV index based on the evaluation results for the Samples 1 to 6 shown in Table 1. As shown in FIG. 4, it has been found that the defect rate of the pulse voltage withstand can be reduced by setting $C_{IE}/C_D$ to less than 1.51.

Regarding the characteristics other than the pulse voltage withstand characteristics, good results were obtained for all the Samples regardless of the difference between Comparative Example and Examples. The multilayer ceramic capacitors of each of the Samples 1 to 6 had COG characteristics defined by the EIA standard. That is, it was found that in Examples (Samples 2 to 6) in which the first segregation grains and the second segregation grains are contained at a predetermined ratio, the pulse voltage withstand defects can be reduced as compared with the related art while maintaining other characteristics such as ε, tan δ, VB, and IR. In particular, it was confirmed that regarding the dielectric breakdown voltage BDV and the insulation resistance IR, the Samples 2 to 6, which are Examples, had a tendency to be slightly improved as compared with Comparative Example (Sample 1).

The line analysis result shown in FIG. 3B was a result of analyzing the capacitor sample of the Sample 3. That is, in the Sample 3, the concentration gradient of Mn was observed in the dielectric grains, and the concentration gradient of Al was substantially not observed in the dielectric grains. In the Sample 3, $M_{Mn}/M_{Si}$ in the first segregation grains was more than 0.38 and 1.30 or less. In the Sample 3 having such a characteristic, the P-TV index exhibited a lower value among those of Examples, and VB and IR exhibited the highest values among those of Examples.

REFERENCE SIGNS LIST 2 multilayer ceramic capacitor
4 element main body
4a end surface
4b side surface
10 ceramic layer
12 internal electrode layer
20 dielectric grain
21 grain boundary phase
30 segregation grain
31 first segregation grain
32 second segregation grain
6 external electrode

What is claimed is:

1. A dielectric composition, comprising:
dielectric grains containing a main component represented by a composition formula $[(Ca_xSr_{(1-x)})O]_m [(Ti_yHf_zZr_{(1-y-z)})O_2]$;
a grain boundary phase located between the dielectric grains; and
segregation grains each containing at least Ca, Si, and O (oxygen), wherein
the composition formula satisfies $1.020<m$,
a first segregation grain is defined as a segregation further containing Mn among the segregation grains each containing at least Ca, Si, and O,
a second segregation grain is defined as a segregation containing substantially no Mn among the segregation grains each containing at least Ca, Si, and O, and
$N1/(N1+N2)$ is more than 0.23 and 1.00 or less, in which N1 is a number density of first segregation grains in a cross-section of the dielectric composition, and N2 is a number density of second segregation grains in the cross-section of the dielectric composition.

2. The dielectric composition according to claim 1, wherein
the first segregation grain satisfies $0.38<(M_{Mn}/M_{Si}) \leq 1.30$, in which $M_{Mn}$ (mol %) is a content rate of Mn in terms of MnO in the first segregation grain, and $M_{Si}$ (mol %) is a content rate of Si in terms of $SiO_2$ in the first segregation grain.

3. The dielectric composition according to claim 1, wherein
an average concentration of Mn in the grain boundary phase is higher than an average concentration of Mn in the dielectric grains, and
at least one of the dielectric grains has a concentration gradient in which a concentration of Mn decreases from a grain boundary toward a grain center, and substantially has no Al concentration gradient.

4. A multilayer ceramic electronic component, comprising:
a ceramic layer containing the dielectric composition according to claim 1; and
an internal electrode layer in contact with the ceramic layer, wherein
$C_{IE}/C_D$ is less than 1.51, in which $C_D$ (mol %) is a content rate of Mn in the ceramic layer, and $C_{IE}$ (mol %) is a content rate of Mn in the internal electrode layer.

* * * * *